Jan. 4, 1927.
G. H. ELLINWOOD
INNER TUBE
Filed Nov 7, 1921
1,613,089
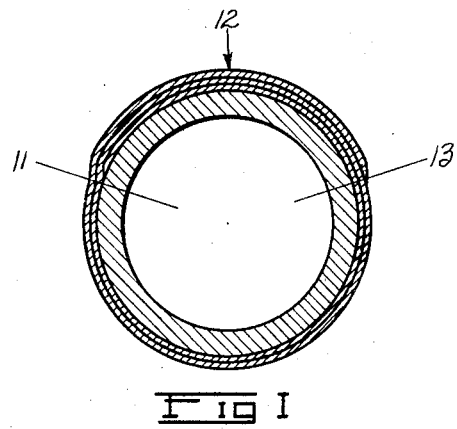
Fig 1
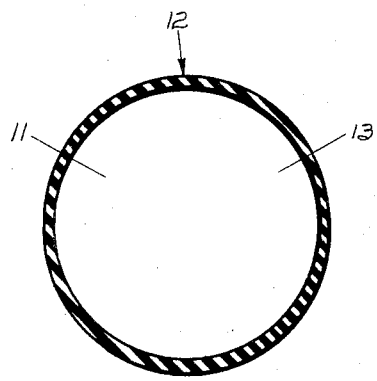
Fig 2
Fig 3
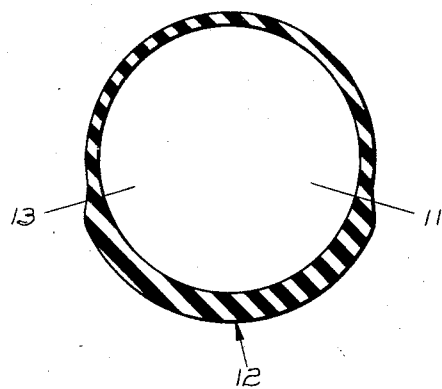
GEORGE H. ELLINWOOD
INVENTOR
BY Hadley Freeman
ATTORNEY Patented Jan. 4, 1927.

1,613,089

UNITED STATES PATENT OFFICE.

GEORGE H. ELLINWOOD, OF MILWAUKEE, WISCONSIN, ASSIGNOR, BY MESNE ASSIGNMENTS, TO FISK RUBBER COMPANY, OF CHICOPEE FALLS, MASSACHUSETTS, A CORPORATION OF MASSACHUSETTS.

INNER TUBE.

Application filed November 7, 1921. Serial No. 513,469.

My invention relates to inner tubes and the principal object of my invention is to provide new and improved tubes and a new and improved method of making the same. In the drawings accompanying this specification and forming a part thereof I have shown, for purposes of illustration, two tubes embodying my invention. In these drawings:

Figure 1 is a section through a raw tube,

Figure 2 is a section through one of the tubes illustrated as embodying my invention, while Figure 3 is a section through the other such tube.

Inner tubes may be cured on a substantially circular mandrel to thereby cure the tube in substantially the shape in which it is to be used but it is more economical to cure such tubes on a straight mandrel and form the straight tube into an annulus after curing. Forming the straight tube into an annulus after curing results in producing a relatively different circumferential length in each longitudinal line of the tube and inflation of the tube places the outer tread portion of the tube under greater tension than the inner or rim portion so that inflation relatively elongates the outer or tread portion and thereby reduces the relative thickness of the tread portion. On the other hand, this tread portion is the part of the tube which is most subject to puncture and which therefore should normally be of a thickness at least equal to that of any other portion. It has been proposed to correct this condition by forming the straight tube of unequal thickness and making that part of the tube which is to become the tread portion of greater thickness than that portion which is to become the rim portion so that in the inflated tube the tread portion will still be at least as thick as the rim portion.

It has been proposed to thicken the tube in this manner by tubing it through an eccentric die. In certain cases, however, it is more desirable to calender stock and roll the tube than to tube the tube and in such cases the tube cannot be so thickened. I find, however, that the result may be accomplished by rolling the stock onto a mandrel in the manner shown in the drawings wherein the sheet is shown as wound one or more times about the mandrel and then continued from the line 11 over the region 12 to the line 13 to thereby add an extra ply over the region 12. When the tube is formed into the annulus this extra ply supplies sufficient material so that the tread portion of the tube after assuming annular form is still as thick or thicker than the remainder of the tube. Further, with this construction the rim portion, which is subject to pinching and chafing, is then thicker than the side portions which are subject to practically no wear.

When a tube is used with a clincher tire without a flap, and particularly with a clincher cord, normal conditions of wear are often reversed and the greatest damage to the tube comes through pinching and abrasion by the movement of the beads. In such case it may be desirable to thicken the base of the tube so that that part is considerably thicker than the tread portion and therefore heavy enough to prevent pinching. Such a construction is particularly desirable when the tube is already of sufficient general thickness to provide a satisfactory tread portion.

The tube may be thickened at the base by forming the raw tube of excess thickness and this uneven thickness may be secured by either of the methods above described except that the thickened portion will be placed at the inside of the annulus instead of at the outside.

I have described herein certain embodiments of my invention but this description is illustrative only and my invention is not limited thereto.

I claim:

1. The method of manufacturing calendered inner tubes which comprises forming the tube by rolling the calendered stock about a straight mandrel with the stock overlapping that portion which in the finished tube is subject to distortion an amount sufficient to substantially equalize the decrease in thickness of the tube when the latter is formed into an annulus and inflated and curing the tube while on the straight mandrel.

2. A vulcanized annular inner tube of unequal thickness when uninflated and of uniform thickness when inflated.

3. A vulcanized annular inner tube having a tread portion of increased thickness when in an uninflated condition, the increased thickness of said portion being such that the tube is of uniform thickness throughout when in an inflated condition.

In testimony whereof I have signed my name to the above specification.

GEORGE H. ELLINWOOD.